United States Patent [19]

Ito et al.

[11] 4,054,152
[45] Oct. 18, 1977

[54] CHECK VALVE

[75] Inventors: Mikiji Ito, Nagoya; Zyunziro Yosimura, Okazaki, both of Japan

[73] Assignee: Nippondenso Co., Ltd., Kariya, Japan

[21] Appl. No.: 646,743

[22] Filed: Jan. 6, 1976

[30] Foreign Application Priority Data

| Mar. 11, 1975 | Japan | 50-33080[U] |
| Mar. 13, 1975 | Japan | 50-33704[U] |
| Mar. 24, 1975 | Japan | 50-39613[U] |
| Apr. 11, 1975 | Japan | 50-49730[U] |
| Apr. 23, 1975 | Japan | 50-56315[U] |
| Apr. 23, 1975 | Japan | 50-56318[U] |
| June 6, 1975 | Japan | 50-81769[U] |
| June 6, 1975 | Japan | 50-81770[U] |
| June 20, 1975 | Japan | 50-85654[U] |

[51] Int. Cl.² ............................................. F16K 15/14
[52] U.S. Cl. .................................... 137/512; 137/854; 137/512.3
[58] Field of Search ............ 137/517, 550, 512, 512.3, 137/512.15, 493, 493.8, 493.9, 854

[56] References Cited

U.S. PATENT DOCUMENTS

| 2,195,335 | 3/1940 | Loginov | 137/512 X |
| 2,271,497 | 1/1942 | Newell | 137/493 |
| 2,502,525 | 4/1950 | Krugler | 137/512 X |
| 2,932,322 | 4/1960 | Mercier | 137/517 X |
| 2,948,296 | 8/1960 | Thorburn | 137/517 |
| 3,322,281 | 5/1967 | Gulick | 137/512 X |
| 3,835,884 | 9/1974 | Ishikawa et al. | 137/550 |
| 3,918,483 | 11/1975 | Leeuwen | 137/550 |

Primary Examiner—William R. Cline
Attorney, Agent, or Firm—Cushman, Darby & Cushman

[57] ABSTRACT

A check valve has a valve member seated on a separating wall member in a housing to interrupt the flow of fluid. The valve member is formed to be unseated from the separating wall member in its free state so that the fluid may flow through a clearance between the valve member and the separating wall member when the pressure difference between one side of the separating wall member and the other is small, while it is formed to be seated on the separating wall member when the pressure difference has become larger. Therefore, the fluid can pass in the both directions crossing the separating wall member when the pressure difference is small, while it is interrupted when the pressure difference has increased.

12 Claims, 46 Drawing Figures 4,054,152

CHECK VALVE

BACKGROUND OF THE INVENTION

The present invention relates to an improvement in check valve. In a conventional check valve, there is provided a separating wall member in the housing which has an inlet and an outlet ports connected with outer conduits for directing the fluids, such as air, water, oil and the like. The separating wall member has plurality of openings to pass the fluid therethrough and is usually disposed perpendicularly with respect to the flowing direction of the fluid. The separating wall member usually has a valve member which is made of rubber and fixed to the wall member at its root portion to cover the aforementioned openings. The peripheral portion of the conventional valve member keeps a contact with the wall member in its free condition.

In that case, the fluid can freely flow in one direction through the openings, since the valve member is lifted by the pressure of the fluid. However when the fluid flows in the reverse direction, the periphery of the valve member is pushed onto the separating wall member by the fluid pressure thereby to close the aforementioned openings, so that the fluid flow in the reverse direction is completely cut off.

Therefore, the above check valve is not applicable to specific devices for exhaust gas purification, since the devices require various complex controls. In fact, especially in the vacuum control devices for exhaust gas purification, there is required a special check valve which allows free flowing in one direction, cutting off the flow in the reverse direction under a big pressure difference, while allowing a small flow in the same reverse direction under a small pressure difference.

SUMMARY OF THE INVENTION

It is a primary object of the present invention to provide an improved check valve which cuts off the flow of the fluid in one direction, allowing a small flow of the fluid when the pressure difference is small.

Another object of the present invention is to provide a check valve which has a valve member, the periphery of which is designed to be apart from a valve seat in the free state, thereby allowing a small flow of fluid through a clearance between the valve member and the valve seat when the pressure difference is not so high.

A further object of the present invention is to provide a check valve having a valve member which is unseated from the valve seat by the action of the spring disposed therebetween or by the resiliency of the valve member itself, thereby allowing a small flow of fluid subject to a small pressure difference.

The other objects, features and advantages of the present invention will be apparent from the following detailed description of the preferred embodiments of the present invention.

DETAILED DESCRIPTION OF THE PREFERRED EMBODIMENTS

Figure 1:
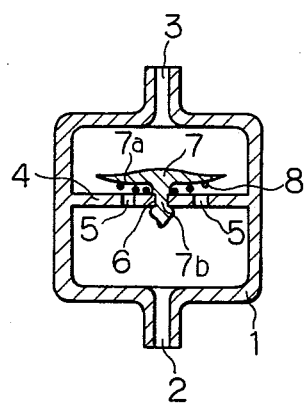
FIG. 1 shows a cross sectional view of the first embodiment of the present invention.
Figure 2:
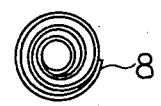
FIG. 2 shows a plan view of the spring used in the embodiment shown in FIG. 1.
Figure 3:
FIG. 3 shows a cross sectional view of the spring shown in FIG. 2.

With reference to FIG. 1, a housing 1 forms a part of conduits for flowing the fluid therethrough and is made of, for example, plastics. The housing 1 is shaped round and has a separating wall member 4 in the central part thereof, which is disposed perpendicularly with respect to the flowing direction of the fluid so as to interrupt the flow of fluid. The housing 1 has two ports 2 and 3 along the central axis thereof, through which the fluid can flow into the housing 1. The separating wall member 4 has a plurality of openings 5 through which the fluid flows and a hole 6 in the center thereof. The separating wall member 4 is fixed to the housing 1 by bonding or the like. A valve member 7 is secured to the separating wall member 4 by inserting a root portion 7b into the hole 6. The valve member 7 is made of elastic materials, such as rubber, and has a round flap 7a which covers the openings 5. There is also provided a coil spring 8 shown in FIGS. 2 and 3 between the separating wall member 4 and the valve member 7. The coil spring 8 functions to lift the peripheral portion of the flap 7a to separate the peripheral outer portion from the separating wall member 4, thereby connecting the ports 2 and 3 with each other through a thin clearance between the flap 7a and the separating wall member 4. The peripheral portion of the flap 7a is made larger than the coil spring 8 so that the valve member 7 can perfectly seat on the separating wall member 4. The flap 7a has a tapered cross section as shown in FIG. 1, i.e., the outer portion of the flap 7a is rendered thinner than the central or inner portion. The predetermined pressure difference in which the valve member 7 is seated on the separating wall member 4 can be set by selecting a proper spring and by selecting the thickness of the flap 7a in accordance with the purpose thereof.

The check valve mentioned above functions as follows. When the fluid flows from the port 2 to the port 3, the flap 7a of the valve member 7 is lifted by the pressure of the fluid and the action of the coil spring 8 to permit the fluid to freely flow from the port 2 to the port 3. On the other hand, when the fluid flows from the port 3 to the port 2 and at a comparatively low velocity under comparatively low pressure, the flap 7a of the valve member 7 is kept lifted. Therefore, the fluid flows from the port 3 to the port 2 through the openings 5. When the velocity of the fluid has become higher with the pressure of the fluid against the flap 7a increasing, the flap 7a of the valve member 7 is pushed toward the separating wall member 4 against the action of the coil spring 8, so that the openings 5 are closed to cut off the fluid flow.

In case a small orifice is formed in the separating wall member out of the range covered by the valve member 7 (not shown), the fluid can flow in a small stream from the port 3 to the port 2 even after the flap 7a has been seated on the separating wall member 4. This orifice is useful to equalize the both pressures after a predetermined period of time which is determined by the dimensions of the orifice.

Figure 4:
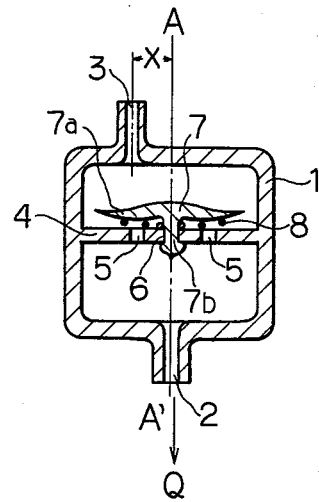
FIG. 4 shows a cross sectional view of the second embodiment of the present invention.
Figure 5:
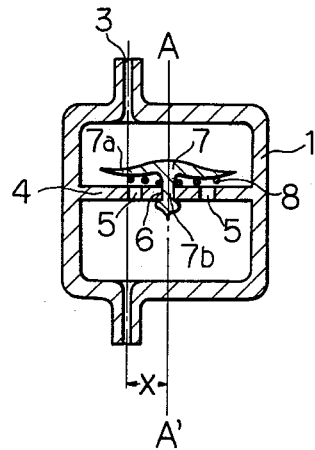
FIG. 5 shows a cross sectional view of the third embodiment of the present invention.
Figure 6:
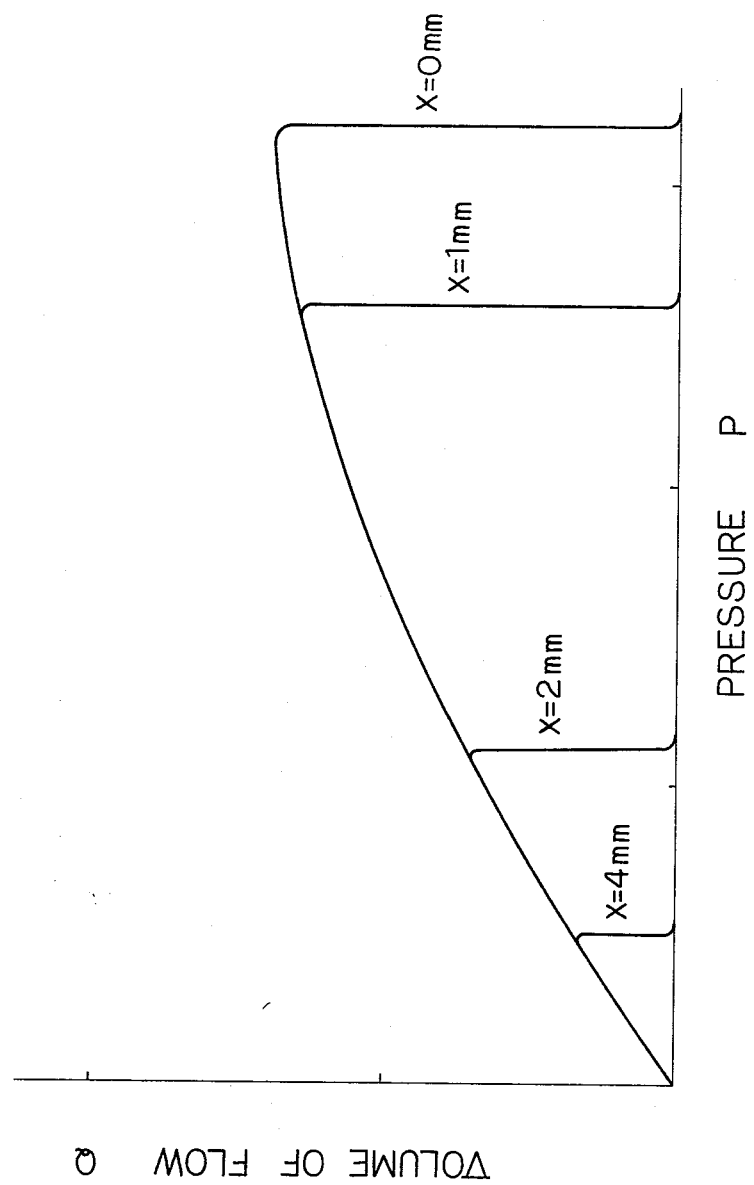
FIG. 6 shows a graph showing fluid control characteristic of the embodiments shown in FIGS. 4 and 5.

In FIG. 4, the port 3 is deviated by distance X from the axis A—A'. The operation of this embodiment is as follows. When the fluid flows from the port 2 to the port 3, the flap 7a of the valve member 7 is lifted by the pressure of the fluid and the action of the coil spring 8, thereby freely flowing the fluid from the port 2 to the port 3 through the openings 5. The position of the deviated port 3 does not give effect on the free flowing of the fluid. On the other hand, when the velocity of the fluid is small, the flap 7a of the valve member 7 is kept lifted thereby permitting the fluid flowing from the port 3 to the port 2 through the openings 5 and, when the velocity of the fluid has become high, the flap 7a is pushed to the separating wall member 4 to close the openings 5. The velocity at which the valve member 7 is closed varies in accordance with the amount of deviation X as shown in FIG. 6. The bigger the deviation becomes the less pressure is required for, the valve member 7 to contact with the separating wall member 4, because the pressure of the fluid is partly and strongly applied to the flap 7a. Therefore the velocity for closing can be easily set by changing the port 3, thereby eliminating troublesome operations such as selection of thickness of the flap 7a and spring constants of the coil spring 8. Further, to deviate the port 2 also as shown in FIG. 5 is also useful. In FIGS. 4 and 5, there is provided only one port on each side of the valve, however to provide a plurality of ports on each side of the valve is also useful. Further, slidable ports on the valve, may be useful since it can correct setting of the velocity of fluid, i.e., switching pressure caused by variations of dimension and material of the flap 7a and the spring 8, just by adjusting the position of the port.

Figure 7:
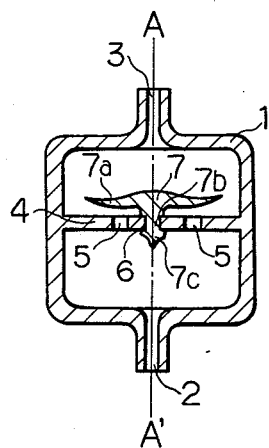
FIG. 7 shows a cross sectional view of the fourth embodiment of the present invention.
Figure 8:
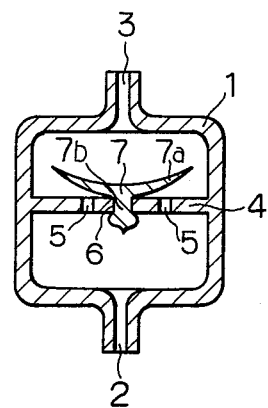
FIG. 8 shows a cross sectional view of the fifth embodiment of the present invention.

In FIG. 7, the flap 7a is formed to be apart from the separating wall member 4 at its peripheral portion is an undulating shape in cross section so that the peripheral portion is lifted from the central portion thereof. The set velocity, i.e., switching pressure can be readily determined by selecting the thickness, material and undulation. The figure of the valve member 7 could be made like saucer as shown in FIG. 8. In both the shapes, the ports 2 and 3 can be deviated from the center axis of the valve member 7 as in the aforementioned embodiment. These valve structures are suitable for mass production, since the valve member 7 can be easily produced by molding and the number of parts is decreased by omitting the spring.

Figure 9:
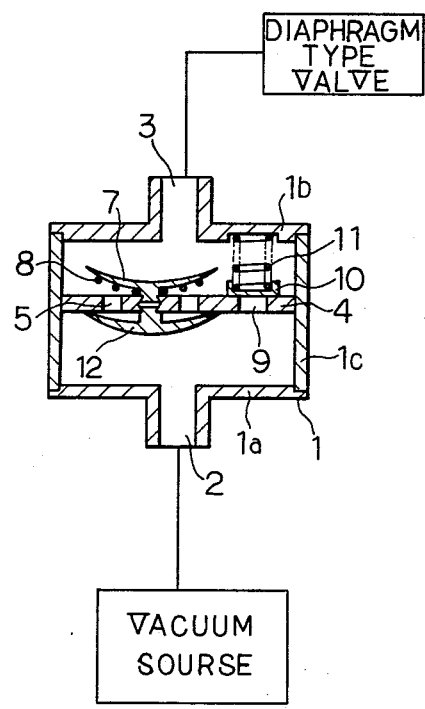
FIG. 9 shows a cross sectional view of the sixth embodiment of the present invention.
Figure 10:
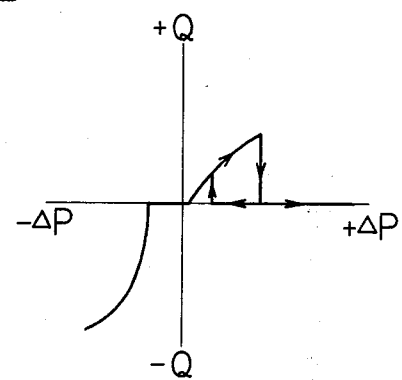
FIG. 10 shows a graph showing a fluid control characteristic of the embodiment shown in FIG. 9.

Referring to FIG. 9, the housing 1 is made of lower and upper caps 1a and 1b and a ring member 1c which are combined tightly to permit fluid leakage. The separating wall member 4 has a further opening 9. A second valve member 10 is pushed toward the wall member 4 by the spring action of a second spring 11. There is also provided a third valve member 12 which is made of rubber and seated on the separating wall member 4 by the spring action of itself to close the openings 5. The valve member 7 could be replaced by the aforementiond one having no spring. The above check valve operates as follows. The operation will be explained with reference to FIG. 10, in which ΔP shows the pressure difference between the side of port 3 and the side of port 2 and Q shows the quantity of fluid flowing therethrough. Assuming that the fluid flows from the port 3 to the port 2 so as to gradually increase its amount, i.e., when the pressure difference ΔP gradually increases, the quantity Q gradually increases until the pressure difference reaches a predetermined valve closing pressure, and thereafter, it falls to zero. To the contrary, when the pressure difference ΔP goes down, the fluid begins to flow at a predetermined valve opening pressure which is lower than the valve closing pressure. Next, the characteristic of the quantity of fluid flowing from the port 2 to the port 3, is shown in the left portion in FIG. 10, i.e., where there is shown that no fluid flow takes place until the pressure diffrence reaches a predetermined value because of the second valve member 10. When the pressure difference goes up beyond the predetermined value, the fluid begins to flow through the opening 9, the third valve member is kept closed. The above check valve is available as a control valves for the secondary air and the exhaust gas in the following manner. Assuming that the port 3 is connected with a diaphragm chamber of the diaphragm-type valve and the port 2 is connected with a vacuum source, the check valve functions not to apply excessive vacuum pressure to the diaphragm chamber. Further, when the vacuum pressure applied to the diaphragm chamber gradually decreases, it is possible to keep the vacuum pressure in the diaphragm chamber as it was for a predetermined period of time in accordance with the hysteresis action of the valve.

Figure 11:
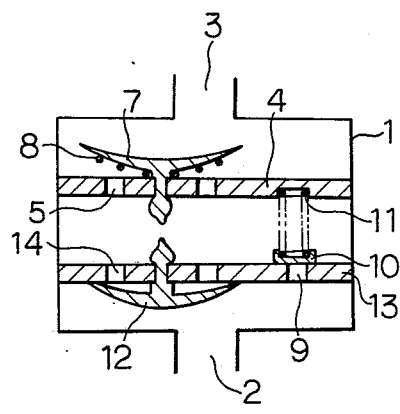
FIG. 11 shows a cross sectional view of the seventh embodiment of the present invention.
Figure 12:
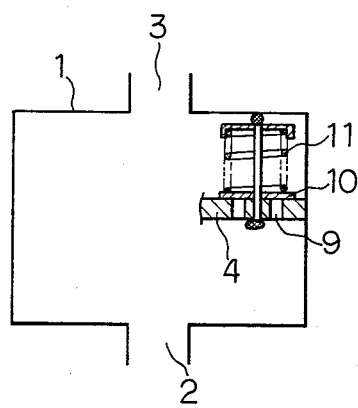
FIGS. 12 and 13 show variations of the second valve member assembly shown in FIG. 11.
Figure 13:
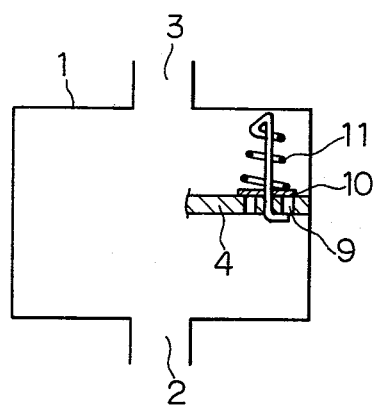

In FIG. 11, a second separating wall member 13 is installed and the third valve member 12 is fixed to the second wall member 13. The second separating wall member 13 also has a plurality of second openings 14 and the second valve member 10 is arranged to close the opening 9 provided on the second wall member 13. The second spring 11 is installed between the two wall members 4 and 13 to push the second valve member 10 toward the opening 9. In this embodiment, the third valve member 12 can be easily fixed to a separate member of the second separating wall member 13. The second valve member assembly including the second valve member 10 and the spring 11 is replaceable by those shown in FIGS. 12 and 13.

Figure 14:
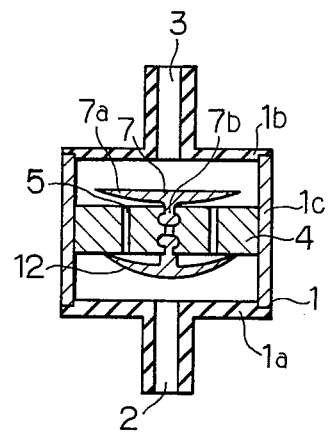
FIG. 14 shows a cross sectional view of the eighth embodiment of the present invention.
Figure 15:
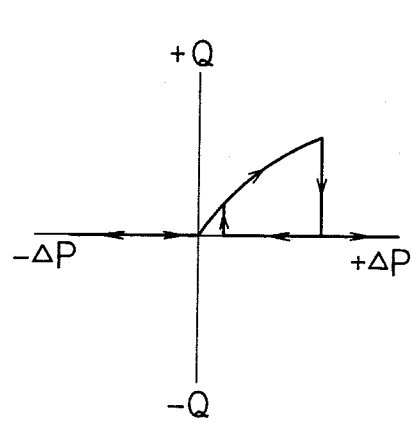
FIG. 15 shows a fluid control characteristic of the embodiment shown in FIG. 14.
Figure 16:
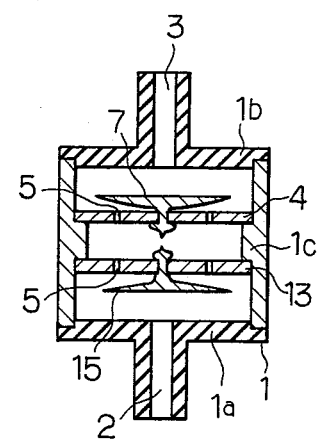
FIG. 16 shows a cross sectional view of the ninth embodiment of the present invention.
Figure 17:
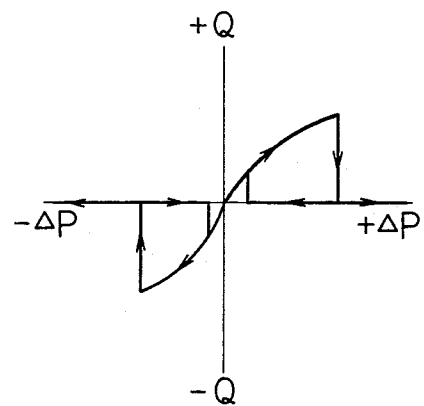
FIG. 17 shows a fluid control characteristic of the embodiment shown in FIG. 16.
Figure 18:
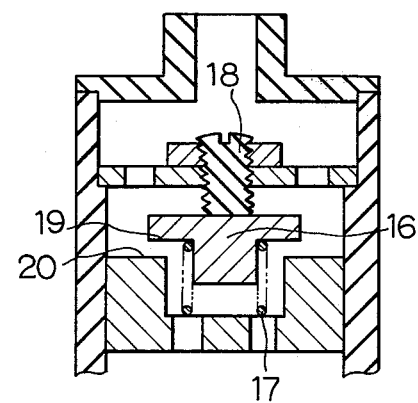
FIG. 18 shows a variation of the first valve assembly used in the embodiments shown in the above Figures.

As in FIG. 14, the second valve member assembly shown in FIG. 9 could be taken off. In this case, the characteristic of the quantity Q of the fluid flowing becomes as shown in FIG. 15, i.e., when the fluid flows from the port 3 to the port 2, the quantity Q varies as shown in the right portion of the graph as that of FIG. 9. However the fluid can not flow in the reverse direction at all as shown in the left portion of the graph. In FIG. 16, a fourth valve member 15 is fixed to the second separating wall member 13 in substitution for the third valve member 12 in FIG. 14. The fourth valve member 15 is just the same as the first valve member 7 so that the characteristic of the quantity Q becomes symmetrical as shown in FIG. 17. The trumpet-like first valve member 7 can be replaced by the assembly shown in FIG. 18. In the figure, a valve body 16 is supported by a spring 17 and restricted by a screw 18. The same flow control characteristic can be obtained in this embodiment, since the flange portion 19 is seated on the stepped portion 20 when the larger pressure difference has occurred.

Figure 19:
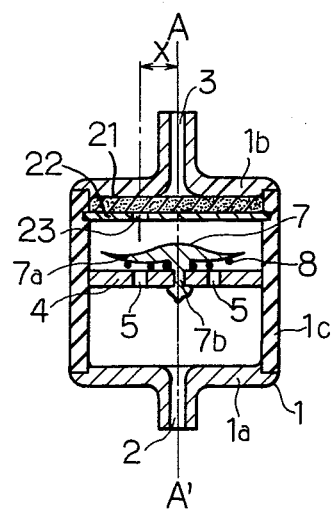
FIG. 19 shows a cross sectional view of the 10th embodiment of the present invention.
Figure 20:
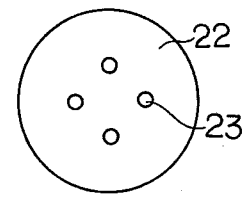
FIG. 20 shows a plan view of the support plate used in the embodiment shown in FIG. 19.

In FIG. 19, there is provided a filter 21 made of spongy plastics or fibrous plastics above the first valve member 7. In addition, a support plate 22 is fixed to the ring member 1c to retain the filter 21. There is also formed an inlet opening 23 through the plate 22 with some deviation X from the axis A—A'. The support plate 22 is replaceable by the other one having a plurality of inlet openings 23 as shown in FIG. 20. In this embodiment having the filter 21, the fluid flowing therethrough is always cleaned up, to keep the valve member assembly in its initial condition. To provide a plurality of inlet openings 23 is useful to make the valve work precisely.

Figure 21:
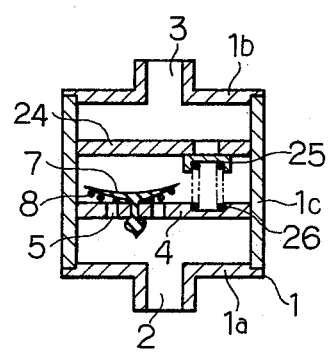
FIG. 21 shows a cross sectional view of the 11th embodiment of the present invention.
Figure 22:
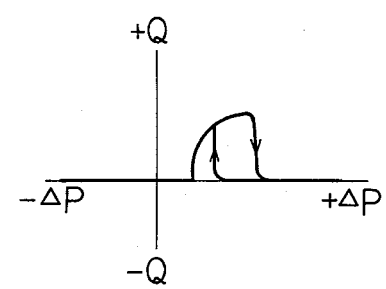
FIG. 22 shows a fluid control characteristic of the embodiment shown in FIG. 21.
Figure 23:
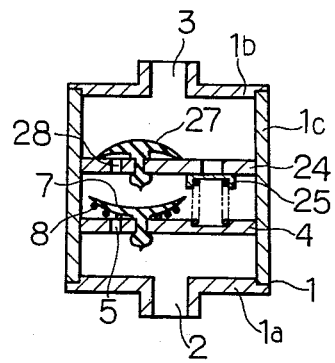
FIG. 23 shows a cross sectional view of the 12th embodiment of the present invention.
Figure 24:
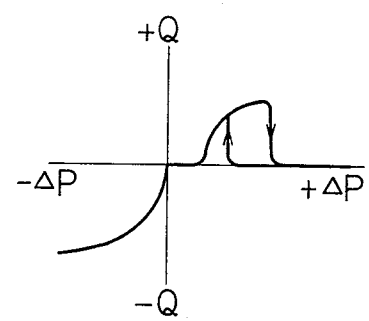
FIG. 24 shows a fluid control characteristic of the embodiment shown in FIG. 23.
Figure 25:
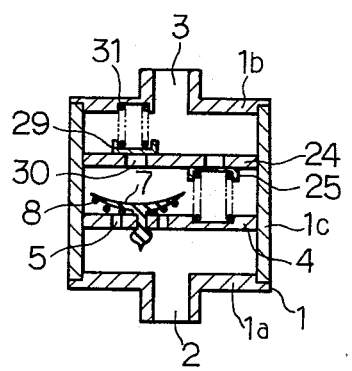
FIG. 25 shows a cross sectional view of the 13th embodiment of the present invention.
Figure 26:
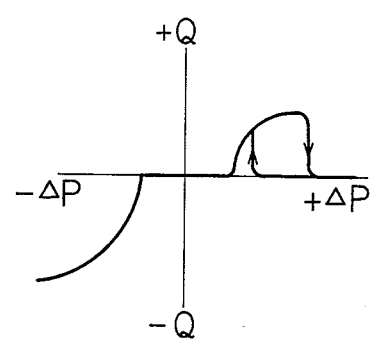
FIG. 26 shows a fluid control characteristic of the embodiment shown in FIG. 25.
Figure 27:
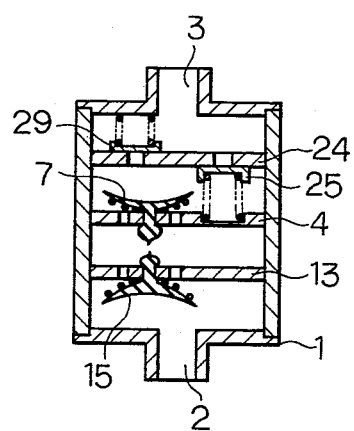
FIG. 27 shows a cross sectional view of the 14th embodiment of the present invention.
Figure 28:
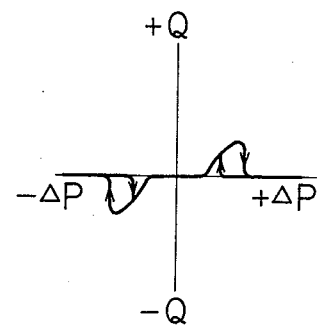
FIG. 28 shows a fluid control characteristic of the embodiment shown in FIG. 27.
Figure 29:
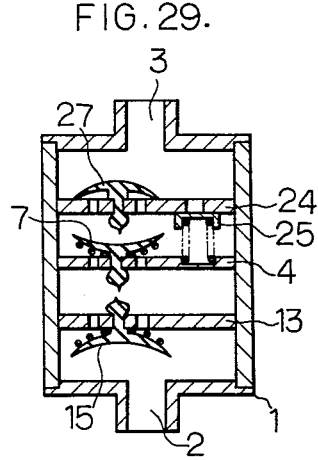
FIG. 29 shows a cross sectional view of the 15th embodiment of the present invention.
Figure 30:
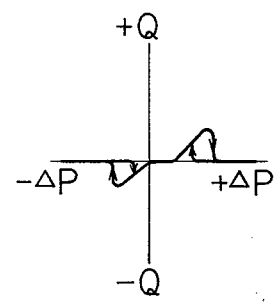
FIG. 30 shows a fluid control characteristic of the embodiment shown in FIG. 29.
Figure 31:
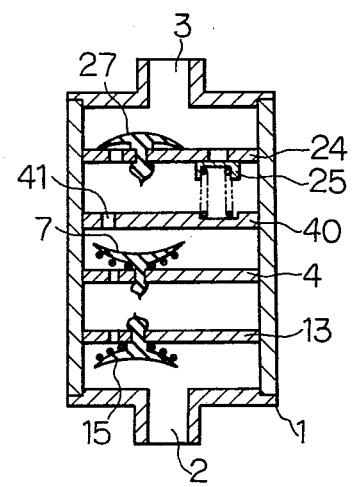
FIG. 31 shows a cross sectional view of the 16th embodiment of the present invention.
Figure 32:
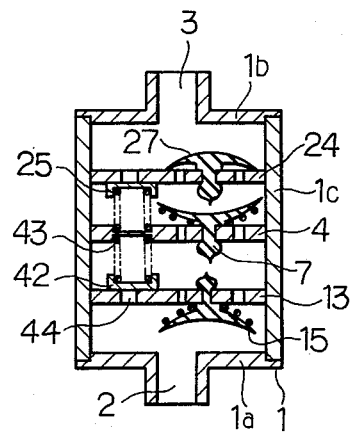
FIG. 32 shows a cross sectional view of the 17th embodiment of the present invention.
Figure 33:
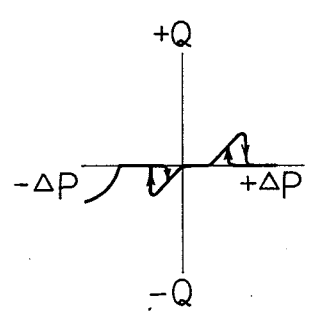
FIG. 33 shows a fluid control characteristic of the embodiment shown in FIG. 32.
Figure 34:
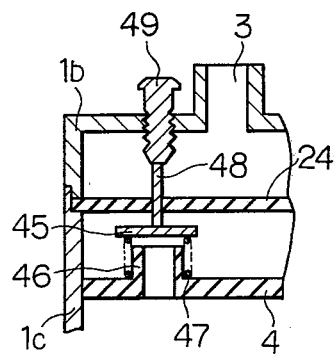
FIG. 34 shows a variation of the first valve member assembly used in the embodiments shown in the above Figures.

Referring to FIG. 21, there is provided a third separating wall member 24 above the first separating wall member 4 with a fifth valve member 25 to which is applied a spring action by a spring 26. In this embodiment, the flow from the port 3 to the port 2 is completely prevented until the pressure difference overcomes the spring action of the spring 26, while thereafter, the same characteristic appears likewise, which is shown in the right portion of the graph in FIG. 22. However the reverse flow is prevented all the time because of the fifth valve member 25. In FIG. 23, a sixth valve member 27 is disposed on the third separating wall member 24 having a plurality of openings 28, therefore the characteristic of the fluid flow directing to the port 3 changes as shown in the left portion of the graph in FIG. 24, i.e., the reverse flow is able to occur contrary to the embodiment of FIG. 21. Further, in FIG. 25, a seventh valve member 29 is disposed to close an opening 30 provided in the third separating wall member 24, therefore, the reverse flow to the port 3 could not appear until the pressure difference overcomes the spring action of the spring 31, the characteristic of which is shown in the left hand side portion of the graph in FIG. 26. In FIG. 27, in addition to the construction of FIG. 25, the second separating wall member 13 and the fourth valve member 15 are combined thereto, therefore the reverse flow to the port 3 is prevented when the pressure difference increases over the set value at which the fourth valve member 15 deforms to be seated on the second wall member 13 as shown in FIG. 28. If the seventh valve member 29 is replaced by the sixth valve member 27 as in FIG. 29, the characteristic changes as shown in FIG. 30, i.e., the reverse flow occurs, even if the pressure difference is small. As in FIG. 31, if a fourth separating wall member 40 is provided to face the opening 41 to the peripheral portion of the first valve member 7, an accurate switching operation of the valve member 7 can be obtained. In FIG. 32, in addition to the construction of the valve of FIG. 29, a combination of a eighth valve member 42 and a spring 43 is disposed to face to an opening 44 formed in the second separating wall member 13, therefore the reverse flow could be occur after the closure of the fourth valve member 15, which is shown in the left hand side portion of the graph is FIG. 33. The valve member assembly can be substituted for that is shown in FIG. 34, i.e. a combination of a flat valve body 45, a projection 46, spring 47, a rod 48 and a screw 49. The combination works as the above valve members as in the case of FIG. 18.

Figure 35:
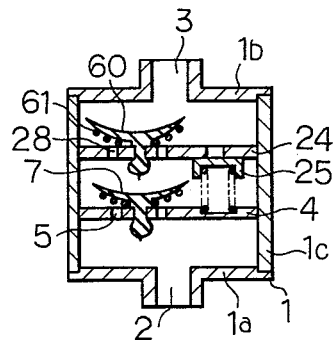
FIG. 35 shows a cross sectional view of the 18th embodiment of the present invention.
Figure 36:
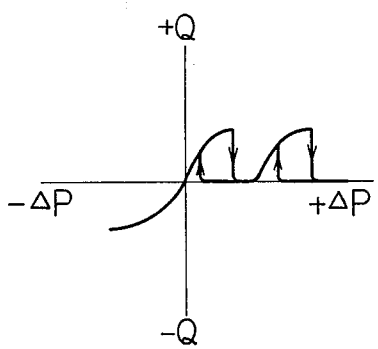
FIG. 36 shows a fluid control characteristic of the embodiment shown in FIG. 35.
Figure 37:
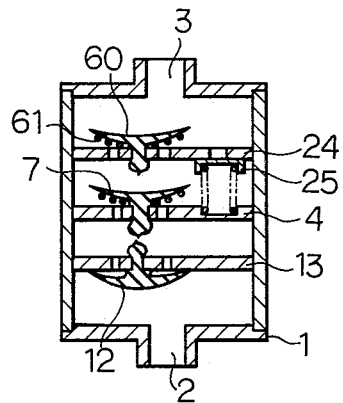
FIG. 37 shows a cross sectional view of the 19th embodiment of the present invention.
Figure 38:
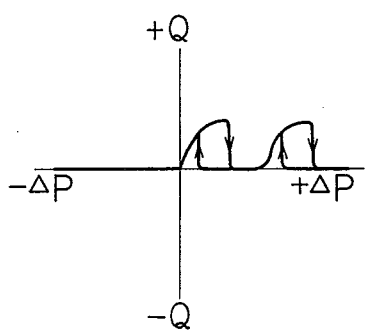
FIG. 38 shows a fluid control characteristic of the embodiment shown in FIG. 37.

In FIG. 35, a ninth valve member 60 and a spring 61 therefor are disposed on the third separating wall member 24 in substitution for the sixth valve member 27 in FIG. 23, therefore two pulses appear in the right portion of the graph in FIG. 36, i.e., assuming that the fluid flows from the port 3 to the port 2, at first, the fluid flows through the ninth valve member 60 and the first valve member 7, then the ninth valve member 60 closes so that there appears no fluid flow until the fifth valve member 25 opens. After the fifth valve member 25 has opened, the fluid keeps flowing through the first valve member 7 until the valve member 7 closes. In FIG. 37, the second separating wall member 13 and the thid valve member 12 in FIG. 11 are added to the construction shown in FIG. 35, therefore no reverse flow appears as shown in the left portion of the graph in FIG. 38.

Figure 39:
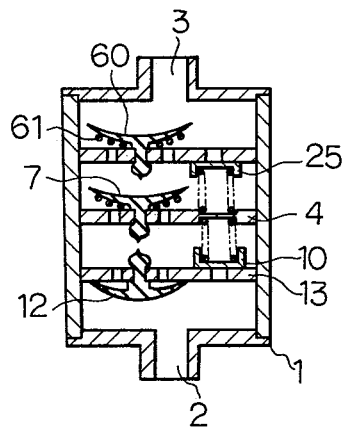
FIG. 39 shows a cross sectional view of the 20th embodiment of the present invention.
Figure 40:
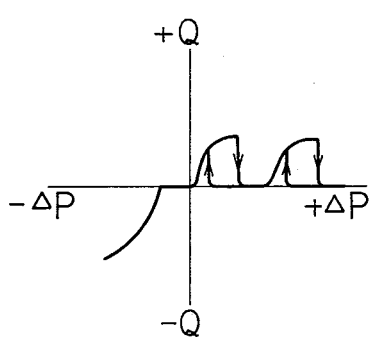
FIG. 40 shows a fluid control characteristic of the embodiment shown in FIG. 39.
Figure 41:
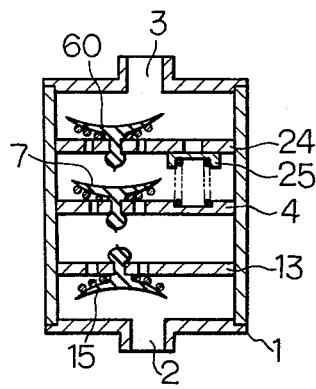
FIG. 41 shows a cross sectional view of the 21st embodiment of the present invention.
Figure 42:
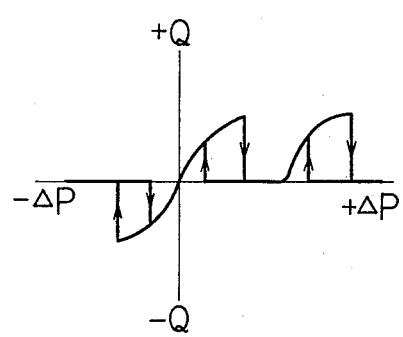
FIG. 42 shows a fluid control characteristic of the embodiment shown in FIG. 41.
Figure 43:
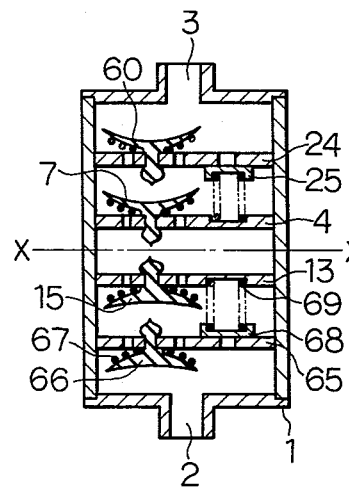
FIG. 43 shows a cross sectional view of the 22nd embodiment of the present invention.
Figure 44:
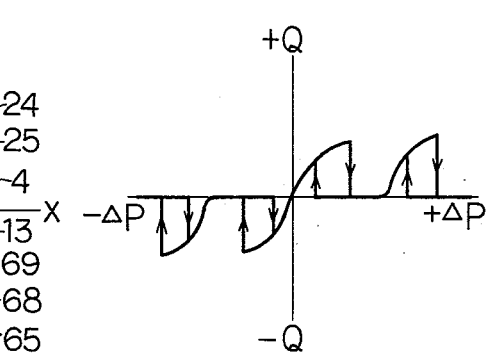
FIG. 44 shows a fluid control characteristic of the embodiment shown in FIG. 43.

In FIG. 39, the second valve member 10 is added to the construction shown in FIG. 37, therefore the reverse flow does not occur until the second valve member 10 opens at a predetermined value, which is shown in the left portion of the graph in FIG. 40. In FIG. 41, the second wall member 13 and the fourth valve member 15 in FIG. 27 are added to the construction of FIG. 35, therefore the reverse flow once begins to flow, while it is prevented by the fourth valve member 15 when the pressure difference rises over the predetermined value, which is shown in FIG. 42. In FIG. 43, a fourth separating wall member 65 and a tenth valve member 66 with a spring 67 are added with an eleventh valve member 68 with a spring 69 to the construction of FIG. 41, therefore, two pulses appear in the left portion of the graph in FIG. 44. This valve is symmetrically constructed with respect to the axis X—X.

Figure 45:
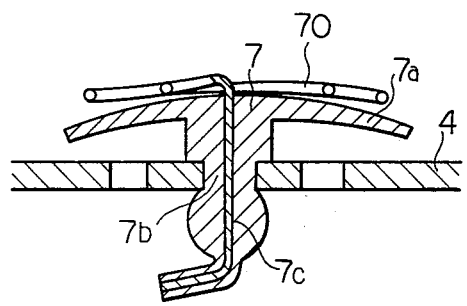
FIG. 45 shows a variation of the first valve member used in the embodiments shown in the above Figures.
Figure 46:
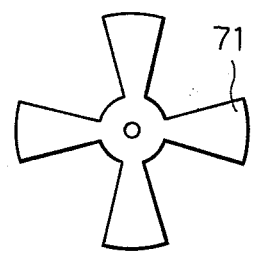
FIG. 46 shows a plan view of the cross-shaped spring used in the embodiment shown in FIG. 45.

The valve members, such as the first valve member 7 are usefully provided with a stopper 70 as shown in FIG. 45. The stopper 70 is made of a volute wire spring, one end of which is inserted into a small hole 7c formed through the body of the valve member 7. One end of the root portion 7b of the valve member 7 is bent together with the end of the stopper 70 to prevent the stopper 70 from escaping from the valve member 7. The volute spring stopper 70 is replaceable by a cross-shaped spring 71 as shown in FIG. 46. These stoppers 70 and 71 are useful to prevent the flap 7a of the valve member 7 from vibrating, since the stoppers 70 and 71 restrict excessive or extra movements of the flap 7a, resulting in smooth operation of the valve member 7.

What we claim is:

1. A fluid flow control apparatus comprising:
    a housing having a first and a second ports;
    first and second separating means disposed in said housing for forming therein a first, second and a third compartments, said first compartment being communicated with said first port, said third compartment being communicated with said second port and said second compartment being disposed between said first and third compartments;
    a first opening formed in said first separating means for communicating said first compartment with said second compartment;
    a second opening formed in said second separating means for communicating said second compartment with said third compartment;
    first valve means, cooperating with said first opening, for permitting fluid flow in one direction only from said first port to said second port through said first opening when a pressure difference in one direction and between said first and second ports exceeds a first predetermined value, whereby the fluid flow in the direction is established from said first port to said second port through said first and second openings;
    second valve means, cooperating with said second opening, for interrupting said fluid flow through said second opening when said pressure difference exceeds a second predetermined value higher than said first predetermined value.

2. A fluid flow control apparatus as set forth in claim 1 further comprising:
    a third opening formed in said first separating means for communicating said first compartment with said second compartment; and
    third valve means, cooperating with said third opening, for permitting opposite fluid flow, opposite to said fluid flow, from said second port to said first port through said third opening.

3. A fluid flow control apparatus as set forth in claim 2 further comprising:
    third separating means, disposed in one of said compartments, for dividing the corresponding compartment into an upstream and a downstream compartment;
    a fourth opening formed in said third separating means for communicating said upstream compartment with said downstream compartment; and
    fourth valve means, cooperating with said fourth opening, for interrupting only said opposite fluid flow through said fourth opening when an opposite pressure difference in the opposite direction and between said first and second ports exceeds a first preset level.

4. A fluid flow control apparatus as set forth in claim 3 further comprising:
    a fifth opening formed in said third separating means or communicating said upstream compartment with said downstream compartment; and
    fifth valve means, cooperating with said fifth opening, for permitting only said opposite fluid flow through said fifth opening when said opposite pressure difference exceeds a second preset level higher than said first preset level.

5. A fluid flow control apparatus as set forth in claim 1 further comprising:
    a third opening formed in said first separating means for communicating said first compartment with said second compartment; and
    third valve means, cooperating with said third opening for permitting opposite fluid flow, opposite to said fluid flow, from said second port to said first port through said third opening when an opposite pressure difference in the opposite direction and between said first and second ports exceeds a first preset level.

6. A fluid flow control apparatus as set forth in claim 5 further comprising;
    third separating means, disposed in one of said compartments, for dividing the corresponding compartment into an upstream and a downstream compartment;
    a fourth opening formed in said third separating means for communicating said upstream compartment with said downstream compartment; and
    fourth valve means, cooperating with said fourth opening for interrupting only said opposite fluid flow through said forth opening when said opposite pressure difference exceeds a second preset level higher than said first preset level.

7. A fluid flow control apparatus as set forth in claim 1 further comprising:

a third opening formed in said first separating means for communicating said first compartment with said second compartment; and third valve means, cooperating with said third opening, for permitting opposite fluid flow, opposite to said fluid flow, from said second port to said first port through said third opening, and also for interrupting said fluid flow until said pressure difference exceeds a third predetermined value lower than said first predetermined value.

8. A fluid flow control apparatus as set forth in claim 7 further comprising:

third separating means, disposed in one of said compartments, for dividing the corresponding compartment into an upstream and a downstream compartment;

a fourth opening formed in said third separating means for communicating said upstream compartment with said downstream compartment; and fourth valve means, cooperating with said fourth opening, for interrupting only said opposite fluid flow through said fourth opening.

9. A fluid flow control apparatus as set forth in claim 8 further comprising:

a fifth opening formed in said third separating means for communicating said upstream compartment with said downstream compartment; and fifth valve means, cooperating with said fifth opening, for permitting only said opposite fluid flow through said fifth opening when an opposite pressure difference in the opposite direction and between said first and second ports exceeds a first preset level.

10. A fluid flow control apparatus as set forth in claim 7 further comprising:

third separating means, disposed in one of said compartments, for dividing the corresponding compartment into an upstream and a downstream compartment, said upstream compartment being closer to said first port than said downstream compartment;

a fourth opening formed in said third separating means or communicating said upstream compartment with said downstream compartment; and fourth valve means, cooperating with said fourth opening, for interrupting only said opposite fluid flow through said fourth opening when an opposite pressure difference in the opposite direction and between said first and second ports exceeds a first preset level.

11. A fluid flow control apparatus as set forth in claim 10 further comprising:

fourth separating means, disposed in said upstream compartment, for dividing the same into an additional upstream compartment and an additional downstream compartment;

a fifth opening formed in said third separating means for communicating said downward compartment with said additional downstream compartment;

a sixth opening formed in said fourth separating means for communicating said additional upstream compartment with said additional downstream compartment;

fifth valve means, cooperating with said fifth opening, for permitting only the opposite fluid flow through said fifth opening when said opposite pressure difference exceeds a second preset level higher than said first preset level; and sixth valve means, cooperating with said sixth opening, for interrupting only the opposite fluid flow through said sixth opening when said opposite pressure difference exceeds a third preset level higher than said second preset level.

12. A fluid flow control apparatus comprising:

a housing having a first and a second ports;

separating means disposed in said housing for forming therein a first and a second compartments, said first compartment being communicated with said first port and said second compartment being communicated with said second port;

a first opening formed in said separating means for communicating said first compartment wth said second compartment;

first valve means, cooperating with said first opening, for permitting fluid flow in one direction only from said first port to said second port through said first opening; and second valve means cooperating with said first opening, for interrupting said fluid flow through said first opening when a pressure difference in one direction and between said first and second ports exceeds a predetermined value;

a second opening formed in said separating means for communicating said first compartment with said second compartment; and third valve means, cooperating with said second opening, for permitting opposite fluid flow, opposite to said fluid flow, from said second port to said first port through said second opening when an opposite pressure difference in an opposite direction and between said first and second ports exceeds a preset level.

* * * * *